US012609383B2

(12) United States Patent
Wu et al.

(10) Patent No.: US 12,609,383 B2
(45) Date of Patent: Apr. 21, 2026

(54) CASING ASSEMBLY, BATTERY CELL, BATTERY, AND ELECTRIC APPARATUS

(71) Applicant: CONTEMPORARY AMPEREX TECHNOLOGY CO., LIMITED, Ningde (CN)

(72) Inventors: Kai Wu, Ningde (CN); Jiajin Cai, Ningde (CN); Yujie Pu, Ningde (CN); Yao Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/317,114

(22) Filed: Sep. 2, 2025

(65) Prior Publication Data

US 2025/0385353 A1     Dec. 18, 2025

Related U.S. Application Data

(63) Continuation of application No. PCT/CN2023/120366, filed on Sep. 21, 2023.

(30) Foreign Application Priority Data

Jun. 14, 2023     (CN) .......................... 202310703637.6

(51) Int. Cl.
| | |
|---|---|
| *H01M 10/615* | (2014.01) |
| *H01M 50/172* | (2021.01) |
| *H01M 50/186* | (2021.01) |
| *H01M 50/30* | (2021.01) |
| *H01M 50/586* | (2021.01) |
| *H01M 50/588* | (2021.01) |

(52) U.S. Cl.
CPC ....... *H01M 50/172* (2021.01); *H01M 10/615* (2015.04); *H01M 50/186* (2021.01); *H01M 50/30* (2021.01); *H01M 50/586* (2021.01); *H01M 50/588* (2021.01)

(58) Field of Classification Search
CPC ............. H01M 50/172; H01M 10/615; H01M 50/186; H01M 50/30; H01M 50/586; H01M 50/588
See application file for complete search history.

(56) References Cited

U.S. PATENT DOCUMENTS

| | | | | |
|---|---|---|---|---|
| 2020/0112010 A1* | 4/2020 | Jiang | ................... | H01M 50/394 |
| 2021/0249723 A1* | 8/2021 | Zheng | ................. | H01M 50/184 |
| 2022/0359936 A1* | 11/2022 | Wang | .................. | H01M 50/193 |
| 2024/0154219 A1* | 5/2024 | Su | ....................... | H01M 50/593 |

FOREIGN PATENT DOCUMENTS

| | | | |
|---|---|---|---|
| CN | 204118200 U | | 1/2015 |
| CN | 109755422 A | | 5/2019 |
| CN | 109860449 A | | 6/2019 |
| CN | 113346170 A | | 9/2021 |
| CN | 113839128 A | | 12/2021 |
| CN | 216903261 U | | 7/2022 |
| CN | 115088132 A | | 9/2022 |
| CN | 115561274 A | | 1/2023 |
| CN | 218215614 U | | 1/2023 |
| CN | 219017791 U | * | 5/2023 |
| CN | 116487788 A | | 7/2023 |
| JP | 2000285904 A | | 10/2000 |
| JP | 2019023971 A | | 2/2019 |
| KR | 20080087345 A | | 10/2008 |
| WO | 2023050923 A1 | | 4/2023 |

OTHER PUBLICATIONS

International Search Report in the international application No. PCT/CN2023/120366, dated Feb. 7, 2024, 8 pages with English translation.
ISA Written Opinion in the international application No. PCT/CN2023/120366, dated Feb. 7, 2024, 8 pages with English translation.
First Office Action received in the counterpart CN application 202310703637.6, dated Aug. 1, 2023, 16 pages with English translation.
Second Office Action received in the counterpart CN application 202310703637.6, dated Aug. 22, 2023, 16 pages with English translation.
Grant Notice received in the counterpart CN application 202310703637.6, dated Sep. 7, 2023, 6 pages with English translation.

* cited by examiner

*Primary Examiner* — Muhammad S Siddiquee

(74) *Attorney, Agent, or Firm* — K&L Gates LLP

(57)     ABSTRACT

A casing assembly, a battery cell, a battery, and an electric apparatus are disclosed. The casing assembly includes a casing and a sealing assembly. The casing has a through hole, and the sealing assembly seals the through hole. The sealing assembly includes an insulating member that covers a conductive member. The conductive member includes a first contact portion and a second contact portion. A connecting member with a hollow inner cavity is connected to the casing, and the insulating member fills the inner cavity. The first contact portion is located on the inner side of the casing, and the second contact portion is located on the outer side. This structure allows the sealing assembly to block the through hole and helps prevent electrolyte leakage, thereby enhancing the sealing performance of the casing.

20 Claims, 5 Drawing Sheets

120

CASING ASSEMBLY, BATTERY CELL, BATTERY, AND ELECTRIC APPARATUS

This application is a continuation of International Application No. PCT/CN2023/120366, filed Sep. 21, 2023, which claims priority to Chinese Patent Application No. 202310703637.6, filed on Jun. 14, 2023, and entitled "CASING ASSEMBLY, BATTERY CELL, BATTERY, AND ELECTRIC APPARATUS", which is incorporated herein by reference in its entirety.

TECHNICAL FIELD

This application relates to the field of battery technologies, and in particular, a casing assembly, a battery cell, a battery, and an electric apparatus.

BACKGROUND

In a battery thermal runaway system, simulating a real runaway state of a cell primarily involves arranging a heating apparatus, such as a heating film, inside the cell, and triggering runaway of the cell by heating the cell with the heating film.

In related arts, when a heating apparatus such as a heating film is arranged inside a cell, a through hole needs to be provided on a casing of the battery cell to allow a power line of the heating apparatus to pass through. However, this threading manner of the power line tends to cause a problem of leakage of an electrolyte of the cell, so that the electrolyte may leak from between the power line and the through hole.

SUMMARY

Embodiments of this application are intended to provide a casing assembly, a battery cell, a battery, and an electric apparatus, to address the problem in related arts where a manner of a power line threading through a casing tends to cause electrolyte leakage.

Technical solutions adopted by the embodiments of this application are as follows:

According to a first aspect, an embodiment of this application provides a casing assembly applied to a battery cell, where the casing assembly includes a casing and a sealing assembly. A through hole is provided on the casing, and the sealing assembly is configured to seal the through hole. The sealing assembly includes a conductive member, an insulating member, and a connecting member. The insulating member covers the conductive member, and the conductive member has a first contact portion and a second contact portion respectively exposed from the insulating member. The connecting member is formed with a hollow inner cavity, the insulating member fills the inner cavity, the connecting member is configured to be connected to the casing, and the first contact portion and the second contact portion are respectively located at an inner side and an outer side of the casing.

Beneficial effects of the embodiments of this application: According to the casing assembly provided by the embodiments of this application, the through hole is provided on the casing, the sealing assembly seals the through hole, the connecting member of the sealing assembly is connected to the casing, and the insulating member covers the conductive member and is disposed in the inner cavity of the connecting member, such that the first contact portion and the second contact portion of the conductive member are respectively located at the inner side and the outer side of the casing. That is, the first contact portion and the second contact portion are exposed at the inner side and the outer side of the casing, respectively. The first contact portion being exposed at the inner side of the casing is used as an example for description. A power line of a heating apparatus (such as a heating film) disposed inside the casing can be electrically connected to the first contact portion, while the second contact portion exposed at the outer side of the casing can be connected to an external power source to enable the heating apparatus inside the casing to operate with power. According to the casing assembly provided by the embodiments of this application, the through hole is provided on the casing, the through hole is sealed with the sealing assembly, and the conductive member is used to electrically connect the heating apparatus at the inner side of the casing with the external power source at the outer side of the casing. While normal operation of the heating apparatus is ensured, the sealing effect of the sealing assembly in sealing the through hole is improved, thereby effectively reducing occurrences of electrolyte leakage.

In some embodiments, the casing includes an end cover, and the through hole is provided on the end cover.

With the above technical solution, it can be understood that, the thickness of the end cover is relatively greater than that of other parts of the casing, so that the structural strength of the end cover is higher. Therefore, providing the through hole on the end cover can reduce the probability of damage to the end cover.

In some embodiments, a thickness of the insulating member is greater than a thickness of the connecting member.

With the above technical solution, setting the thickness of the insulating member to be greater than the thickness of the connecting member allows the insulating member to protrude beyond the connecting member on at least one side in the thickness direction, thereby ensuring a contact area between the insulating member and the connecting member to enhance connection strength between the insulating member and the connecting member.

In some embodiments, the connecting member has a first end surface, the first end surface is configured to face towards an exterior of the casing, and the insulating member covers at least a portion of the first end surface.

With the above technical solution, the insulating member covers at least a portion of the first end surface, thereby increasing a contact area between the insulating member and the connecting member, further enhancing the connection strength between the insulating member and the connecting member, and also improving an effect of preventing electrolyte leakage.

In some embodiments, the insulating member includes a first insulating portion and a second insulating portion, the first insulating portion is disposed in the inner cavity, the second insulating portion protrudes beyond the first end surface, and the second insulating portion abuts against the first end surface and covers an opening end of the inner cavity.

With the above technical solution, the first insulating portion of the insulating member is disposed in the inner cavity and connected to the connecting member, and the second insulating portion of the insulating member abuts against the first end surface and covers the opening end of the inner cavity, thereby increasing a contact area between the insulating member and the connecting member, and effectively enhancing an effect of preventing electrolyte leakage between the insulating member and the connecting member.

In some embodiments, the first end surface protrudes outward to form a first annular protrusion, and an inner side wall surface of the first annular protrusion abuts against an outer side wall surface of the second insulating portion.

With the above technical solution, the inner side wall surface of the first annular protrusion on the first end surface abuts against the outer side wall surface of the second insulating portion, thereby further increasing a contact area between the insulating member and the connecting member, further enhancing an effect of preventing electrolyte leakage between the insulating member and the connecting member, and also improving connection strength between the insulating member and the connecting member.

In some embodiments, the connecting member has a second end surface, the second end surface is configured to face towards an interior of the casing, and the insulating member covers at least a portion of the second end surface.

With the above technical solution, the insulating member covers at least a portion of the second end surface, thereby increasing a contact area between the insulating member and the connecting member, further enhancing connection strength between the insulating member and the connecting member, and also improving an effect of preventing electrolyte leakage.

In some embodiments, the insulating member includes a first insulating portion and a third insulating portion, the first insulating portion is disposed in the inner cavity, the third insulating portion protrudes beyond the second end surface, and the third insulating portion abuts against the second end surface and covers an opening end of the inner cavity.

With the above technical solution, the first insulating portion of the insulating member is disposed in the inner cavity and connected to the connecting member, and the third insulating portion of the insulating member abuts against the second end surface and covers the opening end of the inner cavity, thereby increasing a contact area between the insulating member and the connecting member, effectively enhancing an effect of preventing electrolyte leakage between the insulating member and the connecting member, and also improving connection strength between the insulating member and the connecting member.

In some embodiments, the second end surface protrudes outward to form a second annular protrusion, and an inner side wall surface of the second annular protrusion abuts against an outer side wall surface of the third insulating portion.

With the above technical solution, the inner side wall surface of the second annular protrusion on the second end surface abuts against the outer side wall surface of the third insulating portion, thereby further increasing a contact area between the insulating member and the connecting member, further enhancing an effect of preventing electrolyte leakage between the insulating member and the connecting member, and also improving connection strength between the insulating member and the connecting member.

In some embodiments, the casing further includes an insulating layer, the insulating layer is disposed on an inner side surface of the casing, a relief hole is provided on the insulating layer, and the third insulating portion and the second annular protrusion are both disposed in the relief hole.

With the above technical solution, providing the relief hole on the insulating layer and using the relief hole to accommodate the third insulating portion and the second annular protrusion prevent the third insulating portion and the second annular protrusion from protruding beyond the insulating layer.

In some embodiments, the connecting member has a connecting end surface, and the connecting end surface is configured to be sealingly connected to a hole wall of the through hole.

With the above technical solution, the connecting end surface is sealingly connected to the hole wall of the through hole, thereby allowing for better sealing performance of the sealing assembly in sealing the through hole.

In some embodiments, in an axial direction of the through hole and in a direction facing toward an interior of the casing, an aperture of the through hole tends to decrease.

With the above technical solution, the aperture of the through hole tends to decrease in the axial direction and in the direction facing toward the interior of the casing, such that when the sealing assembly is disposed at the through hole, the hole wall of the through hole exerts a supporting force on the sealing assembly, facilitating a connection operation between the sealing assembly and the casing.

In some embodiments, in a thickness direction of the connecting member, an outer diameter of the connecting member tends to decrease.

With the above technical solution, the outer diameter of the connecting member tends to decrease in the thickness direction of the connecting member. When the sealing assembly seals the through hole, and an outer shape of the connecting member corresponds to a hole shape of the through hole, the connecting end surface of the connecting member can have a greater contact area with the hole wall of the through hole, thereby enhancing sealing performance and connection strength between the connecting member and the casing.

In some embodiments, a pressure relief mechanism is disposed on the end cover, and the through hole is located at a peripheral side of the pressure relief mechanism.

With the above technical solution, it can be understood that, a thickness of the end cover near the pressure relief mechanism is greater than a thickness of the end cover farther away from the pressure relief mechanism. Therefore, providing the through hole at the peripheral side of the pressure relief mechanism on the end cover can reduce the probability of damage to the end cover.

In some embodiments, the first contact portion is configured to be disposed at the outer side of the casing, the sealing assembly further includes an insulating sleeve, and the insulating sleeve is configured to be capable of sleeving the first contact portion.

With the above technical solution, when the first contact portion does not need to be connected to an external power source, the first contact portion can be sleeved by the insulating sleeve to reduce the risk of the first contact portion accidentally contacting a charged body such as a pole of the battery cell.

According to a second aspect, an embodiment of this application further provides a battery cell, where the battery cell includes a cell assembly, a heating apparatus, and the casing assembly as described above. The cell assembly is disposed at an inner side of a casing of the casing assembly, the heating apparatus is disposed on the cell assembly, a second contact portion is configured to be disposed at the inner side of the casing, and the heating apparatus is electrically connected to the second contact portion.

Beneficial effects of the embodiments of this application: The battery cell provided by the embodiments of this application includes the casing assembly described above. In a case that the casing assembly has good sealing performance and a low probability of electrolyte leakage, electrolyte leakage is less likely to occur in the battery cell.

According to a third aspect, an embodiment of this application further provides a battery, where the battery includes at least the battery cell as described above.

Beneficial effects of the embodiments of this application: The battery provided by the embodiments of this application includes the battery cell described above. In a case that mild electrolyte leakage occurs in the battery cell, the sealing performance and stability of the battery are better.

According to a fourth aspect, an embodiment of this application further provides an electric apparatus, where the electric apparatus includes at least the battery as described above.

Beneficial effects of the embodiments of this application: The electric apparatus provided by the embodiments of this application includes the battery described above. Based on the battery having good sealing performance and stability, the electric apparatus also exhibits enhanced stability.

BRIEF DESCRIPTION OF DRAWINGS

To illustrate technical solutions in embodiments of this application more clearly, the following briefly describes drawings required for use in the embodiments or related arts. Obviously, the drawings described below are merely some embodiments of this application, and persons of ordinary skill in the art can obtain other drawings based on these drawings without creative efforts.

REFERENCE SIGNS IN THE DRAWINGS

Figure 1:
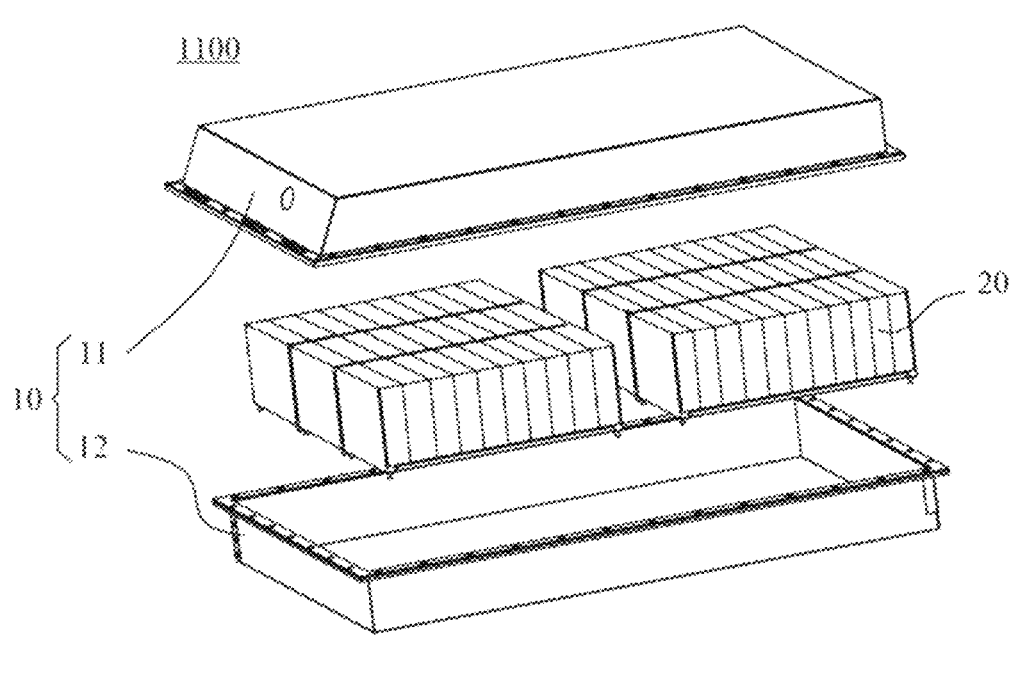
FIG. 1 is a schematic exploded view of a structure of a battery provided by an embodiment of this application.

1100. battery;

10. battery box; 11. first portion; 12. second portion;

20. battery cell; 21. end cover; 22. outer shell; 23. cell assembly; 231. tab; 211. electrode terminal; 2111. positive pole; 2112. negative pole;

100. casing assembly; 110. casing; 111. through hole; 112. insulating layer; 1121. relief hole;

120. sealing assembly;

121. conductive member; 1211. first contact portion; 1212. second contact portion;

122. insulating member; 1221. first insulating portion; 1222. second insulating portion; 1223. third insulating portion;

123. connecting member; 1231. first end surface; 1232. second end surface; 12321. second annular protrusion; 1233. inner cavity; and 1234. connecting end surface.

DESCRIPTION OF EMBODIMENTS

Embodiments of this application are described in detail below, examples of which are illustrated in the accompanying drawings, where identical or similar reference signs throughout denote identical or similar elements or elements having identical or similar functions. The embodiments described below with reference to the accompanying drawings are illustrative and merely for explaining this application. They should not be construed as limitations on this application.

Unless otherwise defined, all technical and scientific terms used herein have the same meanings as commonly understood by persons skilled in the art to which this application pertains. Terms used herein are solely for the purpose of describing specific embodiments and are not intended to limit this application. The terms "comprise", "include", and any variants thereof in the descriptions of the specification, claims, and accompanying drawings of this application are intended to cover a non-exclusive inclusion.

In the descriptions of the embodiments of this application, orientations or positional relationships indicated by the terms "length", "width", "thickness", "inside", "outside", "up", "down", "front", "left", "right", and the like are based on orientations or positional relationships shown in the accompanying drawings, and are merely intended to simplify description of this application for a purpose of easy description, rather than indicating or implying that an apparatus or a part must have a particular direction or must be constructed and operated in a particular orientation. Therefore, this shall not be construed as any limitation on this application.

The terms "first", "second", and the like are merely for the purpose of description, and shall not be understood as any indication or implication of relative importance or any implicit indication of the number of technical features indicated. For example, the first guide member and the second guide member are merely intended to distinguish between different guide members and not to limit their order of precedence, and the first guide member may also be named the second guide member and the second guide member may also be named the first guide member, without departing from the scope of the various described embodiments. The terms "first", "second", and the like do not limit the difference in the characteristics indicated.

In the description of the embodiments of this application, unless otherwise specified and defined explicitly, the terms "connection", "join", and the like should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in this application as appropriate to specific situations. The meaning of "a plurality of" is at least two, that is, two or more.

The term "and/or" in this application is only an associative relationship for describing associated objects, indicating that three relationships may be present. For example, A and/or B may indicate three cases: presence of only A; presence of both A and B; and presence of only B. In addition, a character "/" in this specification generally indicates an "or" relationship between contextually associated objects.

Note that, in this application, words such as "in some embodiments", "exemplarily", "for example" are used to represent examples, descriptions, or explanations. Any embodiments or design schemes described as "in some embodiments", "exemplary", "for example", or similar terms in this application should not be interpreted as being more preferred or advantageous than other embodiments or design schemes. Specifically, the use of terms such as "in some embodiments", "exemplary", "for example", is intended to present relevant concepts in a concrete manner, indicating that specific features, structures, or characteristics described in conjunction with the embodiments can be included in at least one embodiment of this application. The appearance of the above terms in various locations in the specification does not necessarily refer to the same embodiment, nor is it an independent or alternative embodiment mutually exclusive with other embodiments. Persons skilled in the art explicitly or implicitly understand that the embodiments described herein may be combined with other embodiments.

To make the objectives, technical solutions, and advantages of this application more comprehensible, this application is described in detail below with reference to embodiments and accompanying drawings.

Currently, from the perspective of market development trends, the application of power batteries is becoming increasingly widespread. Power batteries are not only applied in energy storage power systems such as hydroelectric, thermal, wind, and solar power plants, but are also widely used in electric vehicles such as electric bicycles, electric motorcycles, and electric cars, as well as in various fields such as military equipment and aerospace. With the continuous expansion of application fields for power batteries, market demand for them is also steadily increasing.

To enhance the safety performance of batteries, a battery thermal runaway system is generally used to simulate the real runaway state of a cell, so as to determine triggering conditions for thermal runaway of the battery. In related arts, a heating film or another heating apparatus is arranged at a cell inside a battery cell, a through hole is provided on a casing of the battery cell, and a power line of the heating apparatus is threaded through the through hole and connected to an external power source to supply power to the heating apparatus for conducting thermal runaway simulation operations. In sealing the through hole through which the power line passes, a sealant is mainly used to fill and applied into the through hole, allowing the sealant to seal the through hole. However, sealing the through hole through sealant filling and coating tends to cause a problem of electrolyte leakage. For example, the electrolyte may corrode the sealant and then leak, or the electrolyte may leak from between the sealant and the power line, or the electrolyte may leak from between an insulating sheath and a conductive copper core of the power line.

In view of the above considerations, to address the problem of potential electrolyte leakage that may occur when a power line is threaded through a casing, a casing assembly is designed. A through hole is provided on a casing of the casing assembly, and a sealing assembly is used to seal the through hole, such that a connecting member of the sealing assembly is connected to the casing. An insulating member covers a conductive member and is disposed in an inner cavity of the connecting member, and a first contact portion and a second contact portion of the conductive member are exposed from the insulating member and respectively located at an inner side and an outer side of the casing, meaning that the first contact portion and the second contact portion are respectively located at a side of the casing facing towards an interior thereof and a side of the casing facing towards an exterior thereof. Thus, a heating apparatus disposed at the cell inside the casing can connect its power line to the first contact portion or the second contact portion located at the inner side of the casing, and the second contact portion or the first contact portion located at the outer side of the casing can be electrically connected to an external power source to achieve the purpose of powering the heating apparatus. With the through hole sealed with the sealing assembly, the power line inside the casing only needs to be connected to a portion of the conductive member exposed from the insulating member and located at the inner side of the casing, eliminating the need for the power line to thread through the casing, thereby effectively avoiding the occurrence of the electrolyte leaking from between an insulating sheath and a conductive copper core of the power line. In addition, the insulating member, the conductive member, and the connecting member of the sealing assembly are an integrated structure, allowing for a low probability of electrolyte leakage inside the sealing assembly. Therefore, the sealing method of sealing the casing with the sealing assembly has a lower probability of electrolyte leakage, effectively mitigating the issue of electrolyte leakage.

The casing assembly disclosed in the embodiments of this application can be used, without limitation, in electric apparatuses such as experimental equipment, vehicles, ships, or aircraft. A power system for the electric apparatus can be formed using the casing assembly and a cell assembly disclosed in this application, which helps improve the sealing performance of the casing assembly, thereby reducing the probability of electrolyte leakage.

The battery cell disclosed in the embodiments of this application can be used in electric apparatuses that use a battery as a power source or in various energy storage systems that use a battery as an energy storage element. The electric apparatus can include, but is not limited to, mobile phones, tablets, laptops, electric toys, electric tools, electric scooters, electric vehicles, ships, spacecraft, experimental equipment, thermal runaway simulation equipment, and the like. Electric toys may include fixed or mobile electric toys, such as game consoles, electric car toys, electric ship toys, and electric airplane toys. Spacecraft may include airplanes, rockets, space shuttles, and spaceships.

For convenience of explanation, the following embodiments take an electric apparatus being a thermal runaway system as an example for description.

The thermal runaway system includes a battery, an external power source, and a heating apparatus. The heating apparatus is disposed inside the battery and electrically connected to the external power source. The heating apparatus releases heat after being powered on and heats the interior of the battery to simulate a thermal runaway state. The heating apparatus can include, but is not limited to, a heating film, a heating wire, or the like. The external power source is a power supply device disposed outside the battery and exists independently of the battery. The external power source is used to provide electrical energy to the heating apparatus.

As shown in FIG. 1, the battery 1100 includes a battery box 10 and a battery unit, where the battery unit is accommodated in the battery box 10. The battery box 10 is used to provide an accommodation space for the battery unit, and the battery box 10 can adopt various structures. In some embodiments, the battery box 10 may include a first portion 11 and a second portion 12. The first portion 11 and the second portion 12 cover each other, and the first portion 11 and the second portion 12 jointly define an accommodation space for accommodating a battery cell 20. The second portion 12 may be a hollow structure with an opening at one end, the first portion 11 may be a plate-like structure, and the first portion 11 covers an opening side of the second portion 12, such that the first portion 11 and the second portion 12 jointly define the accommodation space. Alternatively, both the first portion 11 and the second portion 12 may be hollow structures with an opening on one side, and an opening side of the first portion 11 covers an opening side of the second portion 12. Of course, the battery box 10 formed by the first portion 11 and the second portion 12 may have various shapes, such as a cylinder, a cuboid, or the like.

In the battery 1100, the battery unit may be plural, and the plurality of battery units may be connected in series, in parallel, or in series-parallel. Series-parallel refers to a combination of series and parallel connections among the plurality of battery units. Specifically, the battery unit may be a battery cell 20 or a battery module, where the battery module refers to a modular component formed by assembling a plurality of battery cells 20. The heating apparatus is accommodated in the battery cell 20.

In a specific embodiment, the plurality of battery cells 20 may be directly connected in series, in parallel, or in series-parallel, and then an entirety formed by the plurality of battery cells 20 is accommodated in the battery box 10. Alternatively, the battery 1100 may also be formed by first connecting a plurality of battery cells 20 in series, in parallel, or in series-parallel to form a battery module, and then connecting a plurality of battery modules in series, in parallel, or in series-parallel to form an entirety, which is accommodated in the battery box 10. The battery 1100 may further include other structures. For example, the battery 1100 may further include a busbar component for achieving electrical connection between the plurality of battery cells 20. Specifically, the battery unit may be a battery cell or a battery module, where the battery module refers to a modular component formed by assembling a plurality of battery cells 20.

Each battery cell 20 may be a secondary battery or a primary battery, or may be a lithium-sulfur battery, a sodium-ion battery, or a magnesium-ion battery, but is not limited thereto. The battery cell 20 may be cylindrical, flat, cuboid, or of other shapes.

Figure 2:
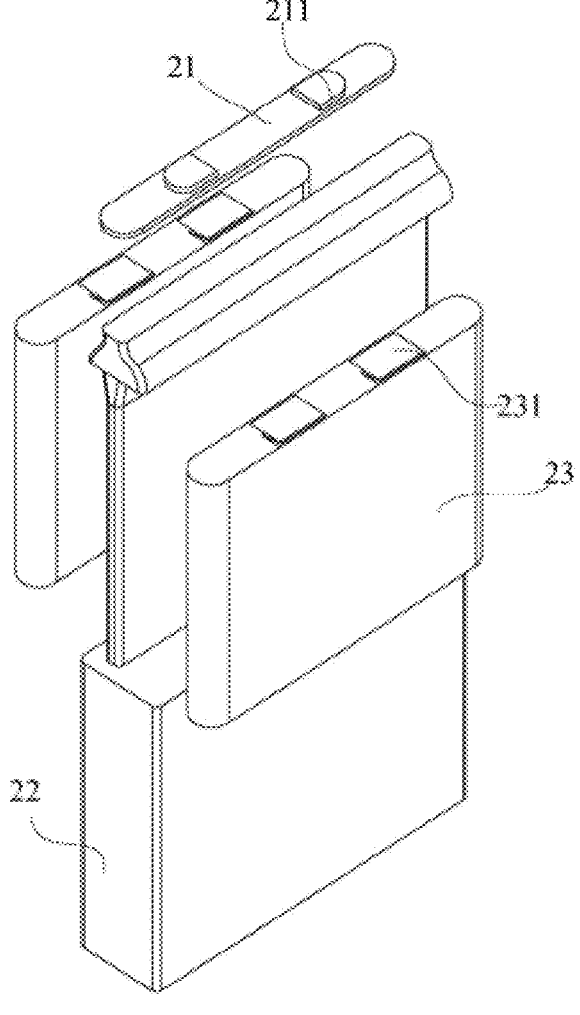
FIG. 2 is a schematic exploded view of a structure of a battery cell provided by an embodiment of this application.
Figure 6:
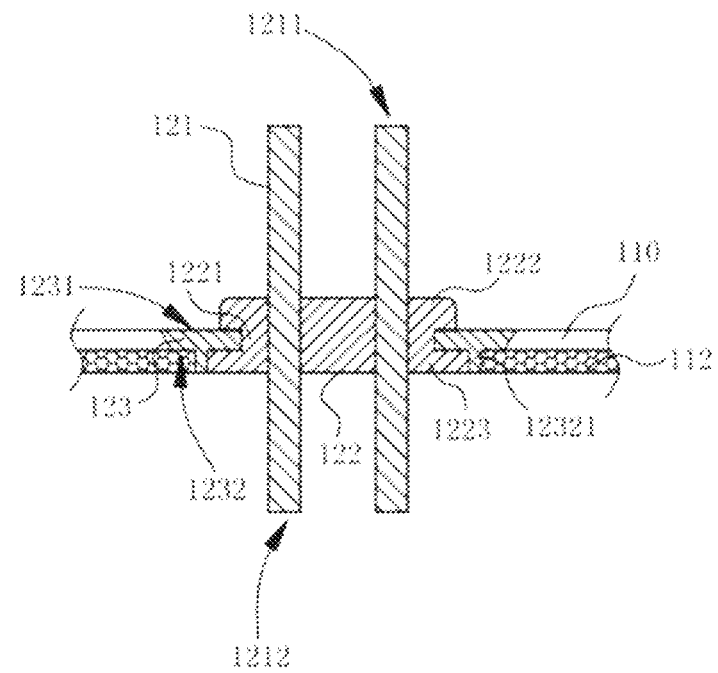
FIG. 6 is a schematic structural cross-sectional view in a case that a sealing assembly seals a through hole according to an embodiment of this application.

Referring to FIG. 2 and FIG. 6, FIG. 2 is a schematic exploded view of a structure of a battery cell 20 provided by some embodiments of this application. The battery cell 20 refers to the smallest unit constituting the battery 1100. As shown in FIG. 2, the battery cell 20 includes a casing assembly 100, a cell assembly 23, and other functional components. The heating apparatus is disposed inside the casing assembly 100 and is used to heat the cell assembly 23 to simulate a thermal runaway state. The casing assembly 100 includes a casing 110, and the casing 110 includes an end cover 21 and an outer shell 22.

The end cover 21 refers to a component that covers an opening of the outer shell 22 to isolate an internal environment of the battery cell 20 from an external environment. Without limitation, a shape of the end cover 21 may be adapted to a shape of the outer shell 22, so that the end cover 21 can fit the outer shell 22. Optionally, the end cover 21 may be made of a material with specified hardness and strength (for example, aluminum alloy), so that the end cover 21 is less likely to deform when subjected to extrusion and collision, allowing the battery cell 20 to have higher structural strength and enhanced safety performance. Functional components such as an electrode terminal 211 may be provided on the end cover 21. The electrode terminal 211 includes a positive pole 2111 and a negative pole 2112, and the positive pole 2111 and the negative pole 2112 can be used to electrically connect to the cell assembly 23 for outputting or inputting electrical energy of the battery cell 20. In some embodiments, the end cover 21 may further be provided with a pressure relief mechanism for releasing internal pressure when an internal pressure or temperature of the battery cell 20 reaches a threshold. It can be understood that, to meet a structural strength requirement for providing the pressure relief mechanism, a thickness of the end cover 21 tends to be greater at a location where the pressure relief mechanism is provided. A material of the end cover 21 may be varied, for example, it may include, but is not limited to, copper, iron, aluminum, stainless steel, aluminum alloy, plastic, or the like. In some embodiments, an insulating member may also be provided at an inner side of the end cover 21. The insulating member may be configured to isolate an electrically connected component in the outer shell 22 from the end cover 21 to reduce a risk of short circuit. For example, the insulating member may be made of plastic, rubber, or the like. It can be understood that, since the end cover 21 is provided with the functional components as described above and the end cover 21 is less prone to deformation during extrusion and collision, the end cover 21 has superior structural strength, and a thickness of the end cover 21 is greater than a thickness of the outer shell 22.

The outer shell 22 is a component used to cooperate with the end cover 21 to form an internal environment of the battery cell 20, where the formed internal environment can be used to accommodate the cell assembly 23, an electrolyte, and other components. The outer shell 22 and the end cover 21 may be separate components, an opening may be provided in the outer shell 22, and the end cover 21 covers the opening to form the internal environment of the battery cell 20. Without limitation, the end cover 21 and the outer shell 22 may also be integrated. Specifically, the end cover 21 and the outer shell 22 may form a shared connection surface before other components are disposed inside the casing, and then the end cover 21 covers the outer shell 22 when an interior of the outer shell 22 needs to be enclosed. The outer shell 22 may have various shapes and sizes, such as a cuboid shape, a cylindrical shape, a hexagonal prism shape, or the like. Specifically, a shape of the outer shell 22 can be determined based on a specific shape and size of the cell assembly 23. A material of the outer shell 22 may be varied, for example, it may include, but is not limited to, copper, iron, aluminum, stainless steel, aluminum alloy, plastic, or the like.

The cell assembly 23 is a component in the battery cell 20 where an electrochemical reaction occurs. The outer shell 22 may contain one or more cell assemblies 23. The cell assembly 23 is mainly formed by winding or stacking a positive electrode sheet and a negative electrode sheet, and typically a separator is provided between the positive electrode sheet and the negative electrode sheet. The heating apparatus may adopt a heating film, and the heating film may be attached to the cell assembly 23. Portions of the positive electrode sheet and the negative electrode sheet having an active material constitute a main body of the cell assembly 23, and portions of the positive electrode sheet and the negative electrode sheet without an active material each constitute a tab 231. A positive tab and a negative tab may be located together at one end of the main body or respectively located at two ends of the main body. During charging and discharging of the battery 1100, a positive active material and a negative active material react with the electrolyte, and the tab 231 connects to the electrode terminal to form a current loop.

In an embodiment of this application, as shown in FIG. 2 to FIG. 5 and FIG. 7, a casing assembly 100 is provided, applied to a battery cell 20. The casing assembly 100 includes a casing 110 and a sealing assembly 120. A through hole 111 is provided on the casing 110, and the sealing assembly 120 is configured to seal the through hole 111. The sealing assembly 120 includes a conductive member 121, an insulating member 122, and a connecting member 123. The insulating member 122 covers the conductive member 121, and the conductive member 121 has a first contact portion 1211 and a second contact portion 1212 respectively exposed from the insulating member 122. The connecting member 123 is formed with a hollow inner cavity 1233, the insulating member 122 fills the inner cavity 1233, the connecting member 123 is configured to be connected to the casing 110, and the first contact portion 1211 and the second contact portion 1212 are respectively located at an inner side and an outer side of the casing 110.

It can be understood that, the casing 110 described above may be the end cover 21, the outer shell 22, or an overall structure after the end cover 21 and the outer shell 22 are assembled. Thus, the through hole 111 provided on the casing 110 may specifically be provided at any location on the end cover 21, or the through hole 111 may also be provided at any location on the outer shell 22. The through hole 111 may include, but is not limited to, a circular hole, a square hole, a rectangular hole, or the like.

It should be understood that the inner side and the outer side of the casing 110 refer to a side of the casing 110 facing towards an interior thereof and a side of the casing 110 facing towards an exterior thereof, respectively.

The sealing assembly 120 seals the through hole 111. Specifically, at least a portion of the sealing assembly 120 may be inserted into the through hole 111, and the connecting member 123 of the sealing assembly 120 is connected to a hole wall of the through hole 111 to achieve sealing. Alternatively, the sealing assembly 120 may be disposed outside the through hole 111, and the sealing assembly 120 is connected to a surface of the casing 110 at an outer side of the casing 110, sealing an opening end of the through hole 111 to achieve sealing.

The conductive member 121 is used to achieve electrical conduction. Specifically, the conductive member 121 may include, but is not limited to, a metal conductor, an alloy conductor, a polymer conductor, or the like. For example, the conductive member 121 may specifically be a copper conductor, a graphite conductor, or the like.

It can be understood that, the conductive member 121 is used to electrically connect to an external power source and a heating apparatus (such as a heating film) inside the casing 110. Therefore, the conductive member 121 includes a first conductor and a second conductor. The first conductor is used to connect to a positive electrode of the external power source and a positive power line of the heating apparatus, and the second conductor is used to connect to a negative electrode of the external power source and a negative power line of the heating apparatus.

Specifically, the conductive member 121 may include two conductors spaced apart. One end of the two conductors is exposed at one side of the insulating member 122 and forms the first contact portion 1211, and another end of the two conductors is exposed at an opposite side of the insulating member 122 and forms the second contact portion 1212. It can be understood that, the first contact portion 1211 and the second contact portion 1212 may include, but are not limited to, structures such as protrusions, contacts, wires, or the like exposed from the insulating member 122.

The insulating member 122 is used to cover the conductive member 121, such that the conductive member 121 and the connecting member 123 are in an insulated state, and the two conductors of the conductive member 121 are also in an insulated state from each other. Specifically, the insulating member 122 may adopt an injection molding process to cover the conductive member 121. For example, the insulating member may be formed into a block structure through injection molding and cover the conductive member 121, such that the first contact portion 1211 and the second contact portion 1212 of the conductive member 121 are exposed from the insulating member 122. The insulating member 122 may be an organic insulating member, such as a plastic insulating member, a rubber insulating member, or the like, or the insulating member 122 may be an inorganic insulating member, such as a glass insulating member, a ceramic insulating member, or the like. Meanwhile, the insulating member may include, but is not limited to, configurations such as a block, a sphere, a cylinder, or the like.

The connecting member 123 is used to connect to the casing 110. The connecting member 123 may include, but is not limited to, a metal connecting member, an alloy connecting member, or the like. Specifically, the connecting member 123 may be a copper connecting member, an aluminum alloy connecting member, a stainless steel connecting member, or the like. A specific form of connection between the connecting member 123 and the casing 110 may be that the connecting member 123 is welded to the casing 110, or the connecting member 123 is threadedly connected to the casing 110, or the like.

The connecting member 123 may have an annular structure. The connecting member 123 with the annular structure forms a hollow inner cavity 1233, and the insulating member 122 can cover the conductive member 121 and fill the inner cavity 1233, such that the insulating member 122, the conductive member 121, and the connecting member 123 form an integrated structure. Specifically, in some specific implementations, the insulating member 122 may be filled and fixed in the inner cavity 1233 of the connecting member 123 through injection molding.

A connection method between the insulating member 122 and the connecting member 123 may be that the insulating member 122 is integrally formed in the inner cavity 1233 of the connecting member 123 through injection molding and fixedly connected to the connecting member 123. Alternatively, the insulating member 122 fills the inner cavity 1233 of the connecting member 123, and the insulating member 122 abuts and is clamped to the connecting member 123 through its own elasticity. Alternatively, the insulating member 122 is adhesively fixed to the connecting member 123. Alternatively, a slot may be provided on the insulating member 122, and a corresponding block may be provided on the connecting member 123, using the engagement of the block and the slot to connect the insulating member 122 and the connecting member 123.

For example, in some specific implementations, the casing 110 includes an end cover 21, and a through hole 111 with a circular structure is provided on the end cover 21. The sealing assembly 120 includes an aluminum pressing piece with a circular annular shape, an insulating injection-molded piece is formed by injection molding in a cavity of the aluminum pressing piece, and the injection-molded piece covers two conductor terminals spaced apart, with the two conductor terminals respectively exposed from the insulating member 122. During assembly, the sealing assembly 120 seals the through hole 111. The aluminum pressing piece can be inserted into the through hole 111, such that an outer side wall surface of the aluminum pressing piece contacts a hole wall of the through hole 111. Then, the aluminum pressing piece is welded to the end cover 21, such that the aluminum pressing piece and the end cover 21 are welded to form an integral body, thereby achieving sealing of the through hole 111 by the sealing assembly 120.

According to the casing assembly 100 provided by the embodiments of this application, the through hole 111 is provided on the casing 110, the sealing assembly 120 seals the through hole 111, the connecting member 123 of the sealing assembly 120 is connected to the casing 110, and the insulating member 122 covers the conductive member 121 and is disposed in the inner cavity 1233 of the connecting member 123, such that the first contact portion 1211 and the second contact portion 1212 of the conductive member 121 are respectively located at an inner side and an outer side of the casing 110. That is, the first contact portion 1211 and the second contact portion 1212 are exposed at the inner side and the outer side of the casing 110, respectively. The first contact portion 1211 being exposed at the inner side of the casing 110 is used as an example for description. A power line of a heating apparatus (such as a heating film) disposed inside the casing 110 can be electrically connected to the first contact portion 1211, while the second contact portion exposed at the outer side of the casing 110 can be connected to an external power source to enable the heating apparatus inside the casing 110 to operate with power. According to the casing assembly 100 provided by the embodiments of this application, the through hole 111 is provided on the casing 110, the through hole 111 is sealed with the sealing assembly 120, and the conductive member 121 is used to electrically connect the heating apparatus at the inner side of the casing 110 with the external power source at the outer side of the casing 110. While normal operation of the heating apparatus is ensured, the sealing effect of the sealing assembly 120 in sealing the through hole 111 is improved, thereby effectively reducing occurrences of electrolyte leakage.

Referring to FIG. 3 to FIG. 6, in some embodiments, the casing 110 includes an end cover 21, and the through hole 111 is provided on the end cover 21.

It can be understood that, since the end cover requires higher structural strength, the thickness of the end cover is relatively greater than that of other parts of the casing 110. Providing the through hole 111 on the end cover, due to the relatively higher structural strength of the end cover, has less impact on the end cover, thereby having less impact on the structural strength of the casing 110 when the through hole 111 is provided.

Figure 3:
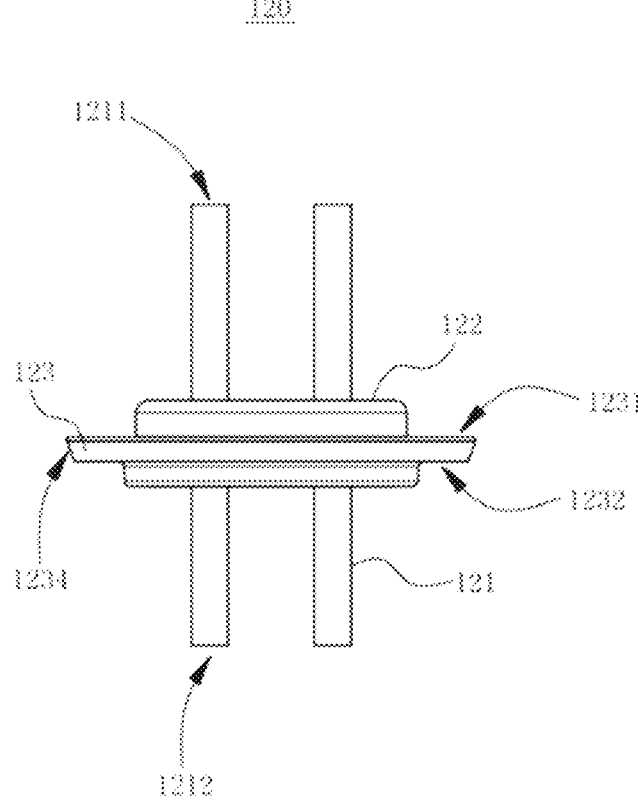
FIG. 3 is a schematic structural diagram of a sealing assembly provided by an embodiment of this application.

Referring to FIG. 3, in some embodiments, a thickness of the insulating member 122 is greater than a thickness of the connecting member 123.

Setting the thickness of the insulating member 122 to be greater than the thickness of the connecting member 123 allows the insulating member 122 to protrude beyond the connecting member 123 on at least one side in a thickness direction, thereby ensuring a contact area between the insulating member 122 and the connecting member 123 to enhance connection strength between the insulating member 122 and the connecting member 123. In addition, this also improves sealing performance between the insulating member 122 and the connecting member 123, thus enhancing an anti-electrolyte leakage effect of the sealing assembly 120.

For example, in some specific implementations, the connecting member 123 may be an annular aluminum pressing piece, the insulating member 122 may be a cylindrical insulating block, the insulating block is inserted into an inner cavity 1233 of the annular aluminum pressing piece, and opposite ends of the insulating block protrude beyond opposite side surfaces of the annular aluminum pressing piece, respectively.

Figure 4:
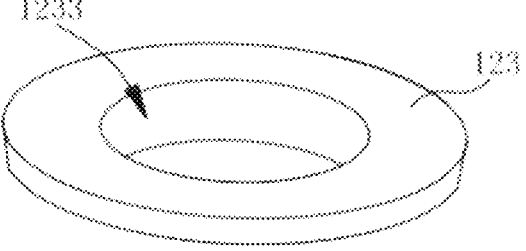
FIG. 4 is a schematic structural diagram of a connecting member of a sealing assembly provided by an embodiment of this application.
Figure 5:
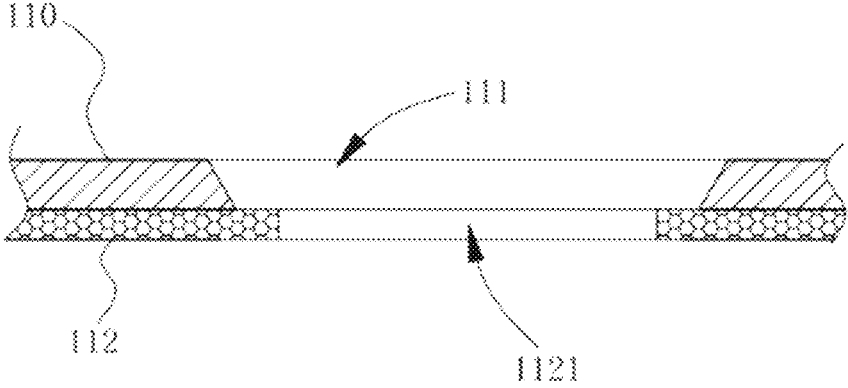
FIG. 5 is a schematic structural diagram of a through hole provided on a casing provided by an embodiment of this application.

Referring to FIG. 3 to FIG. 5, in some embodiments, the connecting member 123 has a first end surface 1231, the first end surface 1231 is configured to face towards an exterior of the casing 110, and the insulating member 122 covers at least a portion of the first end surface 1231.

It can be understood that, the first end surface 1231 refers to an end surface of the connecting member 123 facing towards the exterior of the casing 110 when the connecting member 123 is connected to the casing 110.

When the insulating member 122 fills the inner cavity 1233 of the connecting member 123, an annular gap is formed between the insulating member 122 and the first end surface 1231 of the connecting member 123. The insulating member 122 covers at least a portion of the first end surface 1231, thereby enabling the insulating member 122 to cover at least a portion of the gap.

For example, the insulating member 122 may cover a portion of the first end surface 1231 and simultaneously cover a portion of the gap, thereby increasing a contact area between the insulating member 122 and the first end surface 1231, enhancing connection strength between the insulating member 122 and the connecting member 123. Alternatively, the insulating member 122 may cover a portion of the first end surface 1231 and simultaneously fully cover the gap, meaning that the insulating member 122 protrudes beyond the first end surface 1231 and covers an opening end of the inner cavity 1233 of the connecting member 123, increasing a contact area between the insulating member 122 and the first end surface 1231. This can improve connection strength between the insulating member 122 and the connecting member 123. In addition, a path that an electrolyte inside the casing 110 needs to pass through to leak from between the insulating member 122 and the connecting member 123 becomes longer, meaning a lower probability of electrolyte leakage, thereby effectively improving an effect of preventing electrolyte leakage.

Referring to FIG. 4 and FIG. 6, in some embodiments, the insulating member 122 includes a first insulating portion 1221 and a second insulating portion 1222. The first insulating portion 1221 is disposed in the inner cavity 1233, the second insulating portion 1222 protrudes beyond the first end surface 1231, and the second insulating portion 1222 abuts against the first end surface 1231 and covers an opening end of the inner cavity 1233.

It can be understood that, the first insulating portion 1221 and the second insulating portion 1222 are partial structures of the insulating member 122, respectively.

The first insulating portion 1221 is disposed in the inner cavity 1233; it can be understood that, the first insulating portion 1221 is adapted to the inner cavity 1233. For example, when the inner cavity 1233 of the connecting member 123 is a cylindrical cavity, the first insulating portion 1221 may correspondingly be a cylindrical block, such that the cylindrical block can fully fill the inner cavity 1233 when disposed in the inner cavity 1233. Alternatively, when the inner cavity 1233 of the connecting member 123 is a spherical cavity, the first insulating portion 1221 may correspondingly be a spherical block, such that the spherical block can fully fill the inner cavity 1233 when disposed in the inner cavity 1233.

The second insulating portion 1222 protrudes beyond the first end surface 1231; it can be understood that, the second insulating portion 1222 may include, but is not limited to, a regular structure (such as a cylindrical structure, a spherical structure, a conical structure, or a block structure) or an irregular structure, as long as the second insulating portion 1222 can cover an opening end of the inner cavity 1233.

For example, in some specific implementations, the inner cavity 1233 of the connecting member 123 is a cylindrical cavity, the first insulating portion 1221 of the insulating member 122 correspondingly is a cylindrical insulating block, the second insulating portion 1222 of the insulating member 122 may also be a cylindrical insulating block, the second insulating portion 1222 is coaxially disposed with the first insulating portion 1221, and a diameter of the second insulating portion 1222 is greater than a diameter of the first insulating portion 1221. When the first insulating portion 1221 fills the inner cavity 1233, the second insulating portion 1222 can abut against the first end surface 1231. Since the second insulating portion 1222 is coaxially disposed with the first insulating portion 1221, the second insulating portion 1222 covers a port of the inner cavity 1233.

With this arrangement, the first insulating portion 1221 of the insulating member 122 is disposed in the inner cavity 1233 and connected to the connecting member 123, and the second insulating portion 1222 of the insulating member 122 abuts against the first end surface 1231 and covers the port of the inner cavity 1233, thereby increasing a contact area between the insulating member 122 and the connecting member 123, and effectively enhancing an effect of preventing electrolyte leakage between the insulating member 122 and the connecting member 123.

Referring to FIG. 4 and FIG. 6, in some embodiments, the first end surface 1231 protrudes outward to form a first annular protrusion (not shown in the figure), and an inner side wall surface of the first annular protrusion abuts against an outer side wall surface of the second insulating portion 1222.

The first annular protrusion is integrally formed on the first end surface 1231 of the connecting member 123, and the first annular protrusion can be annularly disposed around the second insulating portion 1222, such that the second insulating portion 1222 is accommodated inside the first annular protrusion. Specifically, the first annular protrusion has an annular structure, and the first annular protrusion may include, but is not limited to, a circular ring structure, a polygonal ring structure, an irregular annular structure, or the like.

It can be understood that, when the first insulating portion 1221 fills the inner cavity 1233 of the connecting member 123, the second insulating portion 1222 can fill the first annular protrusion, such that an outer side wall surface of the second insulating portion 1222 abuts against an inner side wall surface of the first annular protrusion.

With this arrangement, the inner side wall surface of the first annular protrusion on the first end surface 1231 abuts against the outer side wall surface of the second insulating portion 1222, thereby increasing a contact area between the insulating member 122 and the connecting member 123. A path that an electrolyte inside the casing 110 needs to pass through to leak from between the insulating member 122 and the connecting member 123 becomes longer, meaning a lower probability of electrolyte leakage, improving an effect of preventing electrolyte leakage of the sealing assembly 120. In addition, the increased contact area between the insulating member 122 and the connecting member 123 also enhances connection strength between the insulating member 122 and the connecting member 123.

Referring to FIG. 3, FIG. 4, and FIG. 6, in some embodiments, the connecting member 123 has a second end surface

1232, the second end surface 1232 is configured to face towards an interior of the casing 110, and the insulating member 122 covers at least a portion of the second end surface 1232.

It can be understood that, the second end surface 1232 refers to an end surface on one side of the connecting member 123 facing inward of the casing 110 when the connecting member 123 is connected to the casing 110.

When the insulating member 122 fills the inner cavity 1233 of the connecting member 123, an annular gap is formed between the insulating member 122 and the second end surface 1232 of the connecting member 123. The insulating member 122 covers at least a portion of the second end surface 1232, thereby enabling the insulating member 122 to cover at least a portion of the gap.

For example, the insulating member 122 may cover a portion of the second end surface 1232 and simultaneously cover a portion of the gap, thereby increasing a contact area between the insulating member 122 and the second end surface 1232, enhancing connection strength between the insulating member 122 and the connecting member 123. Alternatively, the insulating member 122 may cover a portion of the second end surface 1232 and simultaneously fully cover the gap, meaning that the insulating member 122 protrudes beyond the second end surface 1232 and covers an opening end of the inner cavity 1233 of the connecting member 123, thereby increasing a contact area between the insulating member 122 and the second end surface 1232. This can improve connection strength between the insulating member 122 and the connecting member 123. In addition, a path that an electrolyte inside the casing 110 needs to pass through to leak from between the insulating member 122 and the connecting member 123 becomes longer, meaning a lower probability of electrolyte leakage, thereby effectively improving an effect of preventing electrolyte leakage.

Referring to FIG. 4 and FIG. 6, in some embodiments, the insulating member 122 includes a first insulating portion 1221 and a third insulating portion 1223. The first insulating portion 1221 is disposed in the inner cavity 1233, the third insulating portion 1223 protrudes beyond the second end surface 1232, and the third insulating portion 1223 abuts against the second end surface 1232 and covers an opening end of the inner cavity 1233.

It can be understood that, the first insulating portion 1221 and the third insulating portion 1223 are partial structures of the insulating member 122, respectively.

The first insulating portion 1221 is disposed in the inner cavity 1233. It can be understood that, the first insulating portion 1221 is adapted to the inner cavity 1233; for example, when the inner cavity 1233 of the connecting member 123 is a cylindrical cavity, the first insulating portion 1221 may correspondingly be a cylindrical block, such that the cylindrical block can fully fill the inner cavity 1233 when disposed in the inner cavity 1233. Alternatively, when the inner cavity 1233 of the connecting member 123 is a spherical cavity, the first insulating portion 1221 may correspondingly be a spherical block, such that the spherical block can fully fill the inner cavity 1233 when disposed in the inner cavity 1233.

The third insulating portion 1223 protrudes beyond the second end surface 1232. It can be understood that, the third insulating portion 1223 may include, but is not limited to, a regular structure (such as a cylindrical structure, a spherical structure, a conical structure, a block structure, or the like) or an irregular structure, as long as the third insulating portion 1223 can cover an opening end of the inner cavity 1233.

With this arrangement, the first insulating portion 1221 of the insulating member 122 is disposed in the inner cavity 1233 and connected to the connecting member 123, and the third insulating portion 1223 of the insulating member 122 abuts against the second end surface 1232 and covers an opening end of the inner cavity 1233, thereby increasing a contact area between the insulating member 122 and the connecting member 123, effectively enhancing an effect of preventing electrolyte leakage between the insulating member 122 and the connecting member 123, and also improving connection strength between the insulating member 122 and the connecting member 123.

For example, in some specific implementations, the inner cavity 1233 of the connecting member 123 is a cylindrical cavity, the first insulating portion 1221 of the insulating member 122 correspondingly is a cylindrical insulating block, and both the second insulating portion 1222 and the third insulating portion 1223 of the insulating member 122 may be cylindrical insulating blocks. The second insulating portion 1222 and the third insulating portion 1223 are both coaxially disposed with the first insulating portion 1221, and diameters of the second insulating portion 1222 and the third insulating portion 1223 are both greater than a diameter of the first insulating portion 1221. When the first insulating portion 1221 fills the inner cavity 1233, the second insulating portion 1222 can abut against the first end surface 1231, and the third insulating portion 1223 can abut against the second end surface 1232. In addition, since the second insulating portion 1222 and the third insulating portion 1223 are both coaxially disposed with the first insulating portion 1221, the second insulating portion 1222 covers an opening end on one side of the inner cavity 1233, and the third insulating portion 1223 covers an opening end on another side of the inner cavity 1233, as shown in FIG. 6, effectively enhancing sealing performance and an anti-electrolyte leakage effect of the sealing assembly 120.

Referring to FIG. 4 and FIG. 6, in some embodiments, the second end surface 1232 protrudes outward to form a second annular protrusion 12321, and an inner side wall surface of the second annular protrusion 12321 abuts against an outer side wall surface of the third insulating portion 1223.

The second annular protrusion 12321 is integrally formed on the second end surface 1232 of the connecting member 123, and the second annular protrusion 12321 can be annularly disposed around the third insulating portion 1223, such that the third insulating portion 1223 is accommodated inside the first annular protrusion. Specifically, the second annular protrusion 12321 has an annular structure, and the second annular protrusion 12321 may include, but is not limited to, a circular ring structure, a polygonal ring structure, an irregular annular structure, or the like.

It can be understood that, when the first insulating portion 1221 fills the inner cavity 1233 of the connecting member 123, the third insulating portion 1223 can fill the second annular protrusion 12321, such that an outer side wall surface of the third insulating portion 1223 abuts against an inner side wall surface of the second annular protrusion 12321.

With this arrangement, the inner side wall surface of the second annular protrusion 12321 on the second end surface 1232 abuts against the outer side wall surface of the third insulating portion 1223, thereby further increasing a contact area between the insulating member 122 and the connecting member 123, further enhancing an effect of preventing electrolyte leakage between the insulating member 122 and the connecting member 123, and also improving connection strength between the insulating member 122 and the connecting member 123.

Referring to FIG. 2, FIG. 5, and FIG. 6, in some embodiments, the casing 110 further includes an insulating layer 112, the insulating layer 112 is disposed on an inner side surface of the casing 110, and a relief hole 1121 is provided on the insulating layer 112. The third insulating portion 1223 and the second annular protrusion 12321 are both disposed in the relief hole 1121.

It can be understood that, the insulating layer 112 is used to separate the casing 110 from the cell assembly 23 inside the casing 110, reducing a probability of electrical leakage from the casing 110. Specifically, when the casing 110 is the end cover 21, the insulating layer 112 may be an insulating member 122 covering an inner side of the end cover 21, such as a lower plastic film layer or the like. When the casing 110 is the outer shell 22, the insulating layer 112 may be an insulating separator covering an inner side of the outer shell 22, such as a polyester film or the like.

The relief hole 1121 is provided on the insulating layer 112 to accommodate the third insulating portion 1223 and the second annular protrusion 12321. Specifically, a depth of the relief hole 1121 is a thickness of the insulating layer 112, and the relief hole 1121 may include, but is not limited to, a circular hole, a rectangular hole, a strip hole, an irregular hole shape, or the like.

The third insulating portion 1223 and the second annular protrusion 12321 are both disposed in the relief hole 1121, meaning that the third insulating portion 1223 and the second annular protrusion 12321 are fully located in the relief hole 1121, and a depth of the relief hole 1121 is greater than or equal to a height of the third insulating portion 1223 and the second annular protrusion 12321.

With this arrangement, providing the relief hole 1121 on the insulating layer 112 and using the relief hole 1121 to accommodate the third insulating portion 1223 and the second annular protrusion 12321 prevent the third insulating portion 1223 and the second annular protrusion 12321 from protruding beyond the insulating layer 112, thereby reducing an impact of the third insulating portion 1223 and the second annular protrusion 12321 on internal components of the casing 110.

Referring to FIG. 3 to FIG. 6, in some embodiments, the connecting member 123 has a connecting end surface 1234, and the connecting end surface 1234 is configured to be sealingly connected to a hole wall of the through hole 111.

It can be understood that, the connecting end surface 1234 refers to an end surface of the connecting member 123 facing the hole wall of the through hole 111 when the sealing assembly 120 seals the through hole 111. Specifically, the sealing assembly 120 may be inserted into the through hole 111 to achieve sealing. In this case, the connecting member 123 is located in the through hole 111, and a peripheral side surface of the connecting member 123 around its thickness direction is the connecting end surface 1234.

The connecting end surface 1234 is sealingly connected to the hole wall of the through hole 111. Specifically, a sealing connection method may be: a threaded structure is formed on the connecting end surface 1234, an internal thread is correspondingly formed on the hole wall of the through hole 111, and the connecting member 123 is screwed into the through hole 111, such that the connecting end surface 1234 is threadedly connected to the hole wall of the through hole 111 to form a seal. Alternatively, the connecting end surface 1234 of the connecting member 123 may be fixed to the hole wall of the through hole 111 by welding to form a seal.

Alternatively, the connecting member 123 may be interference-fitted with the through hole 111, such that the connecting end surface 1234 of the connecting member 123 is tightly connected to the hole wall of the through hole 111 to form a seal.

With this arrangement, the connecting end surface 1234 is sealingly connected to the hole wall of the through hole 111, thereby improving sealing performance of the sealing assembly 120 at the through hole 111.

Referring to FIG. 3 and FIG. 5, in some embodiments, in an axial direction of the through hole 111 and in a direction facing toward an interior of the casing 110, an aperture of the through hole 111 tends to decrease.

It can be understood that, the aperture of the through hole 111 tending to decrease specifically refers to: in the axial direction of the through hole 111 and toward the interior of the casing 110, the aperture of the through hole 111 exhibits a linearly decreasing trend. Alternatively, in the axial direction of the through hole 111 and toward the interior of the casing 110, the aperture of the through hole 111 may exhibit a non-linearly decreasing trend. For example, the aperture of the through hole 111 may first remain unchanged and then continuously decrease.

With this arrangement, the aperture of the through hole 111 tends to decrease in the axial direction and in the direction facing toward the interior of the casing 110, such that when the sealing assembly 120 is disposed at the through hole 111, the hole wall of the through hole 111 exerts a supporting force on the connecting member 123 of the sealing assembly 120, facilitating positioning of the sealing assembly 120, thereby facilitating a connection operation between the connecting member 123 of the sealing assembly 120 and the casing 110.

Referring to FIG. 3 to FIG. 6, in some embodiments, in a thickness direction of the connecting member 123, an outer diameter of the connecting member 123 tends to decrease.

It can be understood that, the outer diameter of the connecting member 123 tending to decrease specifically refers to: in the thickness direction of the connecting member 123, the outer diameter of the connecting member 123 exhibits a linearly decreasing trend. Alternatively, in the thickness direction of the connecting member 123, the outer diameter of the connecting member 123 may exhibit a non-linearly decreasing trend. For example, the outer diameter of the connecting member 123 may first remain unchanged and then continuously decrease.

An outer shape of the connecting member 123 may match a hole shape of the through hole 111, meaning that when the sealing assembly 120 is inserted into the through hole 111, the connecting end surface 1234 of the connecting member 123 abuts against the hole wall of the through hole 111. For example, in some specific implementations, the hole shape of the through hole 111 may be a truncated cone shape, meaning that the hole wall of the through hole 111 is inclined, and the connecting end surface 1234 of the connecting member 123 correspondingly is also inclined.

With this arrangement, when the sealing assembly 120 seals the through hole 111, the connecting end surface 1234 of the connecting member 123 has better compatibility with the hole wall of the through hole 111, thus a contact area between the connecting end surface 1234 of the connecting member 123 and the hole wall of the through hole 111 is larger. This enhances sealing performance and connection strength between the connecting member 123 and the casing 110, thereby achieving a purpose of alleviating electrolyte leakage.

Figure 7:
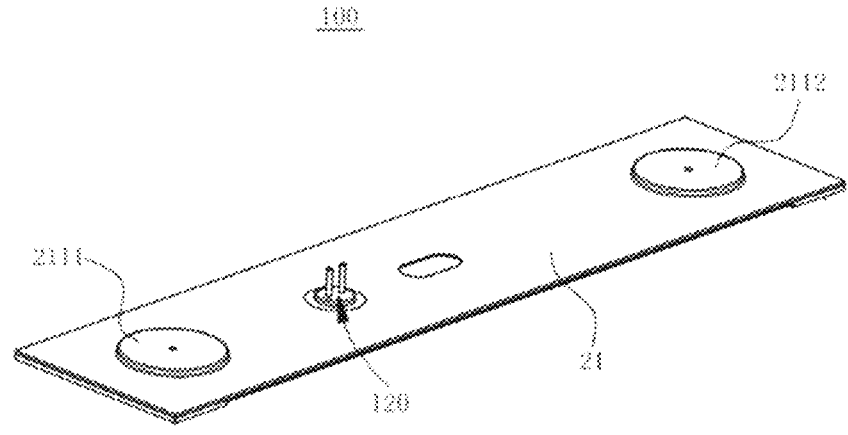
FIG. 7 is a schematic structural diagram for assembly of a sealing assembly when a through hole is provided on an end cover provided by an embodiment of this application.

Referring to FIG. 5 and FIG. 7, in some embodiments, a pressure relief mechanism is disposed on the end cover 21, and the through hole 111 is located at a peripheral side of the pressure relief mechanism.

It can be understood that, to meet a structural strength requirement for providing the pressure relief mechanism, a thickness of the end cover 21 near the pressure relief mechanism is greater than a thickness of the end cover 21 away from the pressure relief mechanism. Therefore, when the through hole 111 is provided at the peripheral side of the pressure relief mechanism on the end cover, since a structural strength of the end cover at this location is higher, providing the through hole 111 on the end cover at this location can reduce a probability of damage to the end cover.

Specifically, the end cover is further provided with a positive pole 2111 and a negative pole 2112. The peripheral side of the pressure relief mechanism refers to a collection of all areas on the end cover 21 where a distance to the positive pole 2111 or the negative pole 2112 is greater than a distance to the pressure relief mechanism. The distance refers to a distance between any point on a surface of the end cover 21 facing towards the exterior and a center point of a plane where the pressure relief mechanism intersects the end cover 21, and a distance between any point on the surface of the end cover 21 facing towards the exterior and a center point of a plane where the positive pole 2111 or the negative pole 2112 intersects the end cover 21.

Referring to FIG. 3 and FIG. 6, in some embodiments, the first contact portion 1211 is configured to be disposed at an outer side of the casing 110, and the sealing assembly 120 further includes an insulating sleeve (not shown in the figure), the insulating sleeve is configured to sleeve the first contact portion 1211.

It can be understood that, when the first contact portion 1211 is disposed at the outer side of the casing 110, correspondingly, the second contact portion 1212 is disposed at an inner side of the casing 110. The first contact portion 1211 is configured to electrically connect to an external power source, and the second contact portion 1212 is configured to electrically connect to a power line of a heating apparatus inside the casing 110.

The insulating sleeve is configured to sleeve the first contact portion 1211 to provide covering insulation protection for the first contact portion 1211. Specifically, the insulating sleeve may be a flexible bag structure, and the bag structure sleeves the first contact portion 1211. Alternatively, the insulating sleeve may also be a rigid block structure with a protective groove provided thereon, and the first contact portion 1211 is inserted into the protective groove, such that the block structure provides sleeving protection for the first contact portion 1211. Alternatively, the insulating sleeve may also be a flexible sheet structure, and the sheet structure can cover the first contact portion 1211 and provide a sleeving protection effect for the first contact portion 1211. The insulating sleeve may include, but is not limited to, a rubber sleeve, a polyester film sleeve, a plastic sleeve, or the like.

Specifically, the conductive member 121 may include two conductors spaced apart, and the first contact portion 1211 includes portions of the two conductors exposed from the insulating member 122 at the outer side of the casing 110. Therefore, the insulating sleeve may include one sleeve structure that simultaneously sleeves and protects the exposed portions of the two conductors. Alternatively, the insulating sleeve may also include two sleeve structures, and the two sleeve structures respectively sleeve the exposed portions of the two conductors.

With this arrangement, when the first contact portion 1211 does not need to be connected to an external power source, the insulating sleeve can sleeve the first contact portion 1211, reducing a risk of the first contact portion 1211 accidentally contacting a charged body such as a pole of the battery cell 20. When the first contact portion 1211 needs to be connected to an external power source, the insulating sleeve is removed from the first contact portion 1211.

For example, in some specific implementations, the casing 110 includes an end cover 21, a through hole 111 is provided on the end cover 21 along a thickness direction of the end cover 21, and the through hole 111 is a circular through hole 111. The connecting member 123 of the sealing assembly 120 is an aluminum pressing piece with a circular annular shape, the insulating member 122 is an injection-molded piece, and the injection-molded piece includes a first cylindrical block, a second cylindrical block, and a third cylindrical block sequentially disposed along a thickness direction, where diameters of the first cylindrical block and the third cylindrical block are greater than a diameter of the second cylindrical block. The conductive member 121 includes two conductive poles, and the two conductive poles are inserted through the injection-molded piece along the thickness direction. The second cylindrical block of the injection-molded piece is used to fill the hollow inner cavity 1233 of the aluminum pressing piece, such that the second cylindrical block fully fills the inner cavity 1233. In addition, the first cylindrical block covers an opening end on one side of the inner cavity 1233 and abuts against a side surface of the aluminum pressing piece, and the third cylindrical block covers an opening end on another side of the inner cavity 1233 and abuts against another side surface of the aluminum pressing piece, thereby enabling tight connection between the injection-molded piece and the aluminum pressing piece and allowing for good sealing performance between the injection-molded piece and the aluminum pressing piece. The sealing assembly 120 is disposed in the through hole 111, a peripheral outer wall of the aluminum pressing piece abuts against a hole wall of the through hole 111, and then the aluminum pressing piece is welded and fixed to the end cover by welding, such that the sealing assembly 120 can seal the through hole 111. In addition, one end of the two conductive poles extends into the casing 110 for electrical connection to the heating apparatus inside the casing 110, and the other end of the two conductive poles extends outside the casing 110 for electrical connection to an external power source.

Referring to FIG. 2 to FIG. 5 and FIG. 7, according to a second aspect, an embodiment of this application further provides a battery cell 20. The battery cell 20 includes a cell assembly 23, a heating apparatus, and the casing assembly 100 as described above. The cell assembly 23 is disposed at an inner side of the casing 110 of the casing assembly 100, the heating apparatus is disposed on the cell assembly 23, the second contact portion 1212 is configured to be disposed at the inner side of the casing 110, and the heating apparatus is electrically connected to the second contact portion 1212.

The heating apparatus is configured to release heat when it is powered on and operating to heat the cell assembly 23. Specifically, the heating apparatus may include, but is not limited to, structures such as a heating film or a heating wire.

The battery cell 20 provided by the embodiments of this application includes the casing assembly 100 described above. Based on the casing assembly 100 having good sealing performance and a lower probability of electrolyte leakage, occurrences of electrolyte leakage in the battery cell 20 are also reduced.

As shown in FIG. 1, according to a third aspect, an embodiment of this application further provides a battery 1100. The battery 1100 includes at least the battery cell 20 as described above. The battery 1100 adopts any battery cell 20 described in the above embodiments. Details are not repeated herein.

According to a fourth aspect, an embodiment of this application further provides an electric apparatus. The electric apparatus includes at least the battery 1100 as described above. The electric apparatus may be any electric apparatus described in the above embodiments, such as a thermal runaway system. Details are not repeated herein.

The above are merely preferred embodiments of this application and are not intended to limit this application. Any modifications, equivalent replacements, improvements, and the like made within the spirit and principles of this application shall be included within the protection scope of this application.

What is claimed is:

1. A casing assembly applied to a battery cell, the casing assembly comprising:
  a casing, wherein the casing is provided with a through hole; and
  a sealing assembly, wherein the sealing assembly is configured to seal the through hole, and the sealing assembly comprises a conductive member, an insulating member, and a connecting member; wherein
  the insulating member covers the conductive member, and the conductive member has a first contact portion and a second contact portion respectively exposed from the insulating member;
  the connecting member is of an annular shape and has a first end surface and a second end surface, the first end surface is configured to face towards an exterior of the casing, the second end surface is configured to face towards an interior of the casing, and the insulating member covers at least a portion of the first end surface and at least a portion of the second end surface; and
  the connecting member is formed with a hollow inner cavity between the first end surface and the second end surface, at least a part of the insulating member fills the inner cavity, the connecting member is configured to be connected to the casing, and the first contact portion and the second contact portion are respectively located at an inner side and an outer side of the casing.

2. The casing assembly according to claim 1, wherein the casing comprises an end cover, and the through hole is provided on the end cover.

3. The casing assembly according to claim 1, wherein a thickness of the insulating member is greater than a thickness of the connecting member.

4. The casing assembly according to claim 1, wherein the insulating member comprises a first insulating portion and a second insulating portion, the first insulating portion is disposed in and fills the inner cavity, the second insulating portion is disposed on the first insulating portion and protrudes beyond the first end surface of the connecting member, and the second insulating portion abuts against the first end surface and covers an opening end of the inner cavity.

5. The casing assembly according to claim 4, wherein the first end surface protrudes outward to form a first annular protrusion, and an inner side wall surface of the first annular protrusion abuts against an outer side wall surface of the second insulating portion.

6. The casing assembly according to claim 1, wherein the insulating member comprises a first insulating portion and a third insulating portion, the first insulating portion is disposed in the inner cavity, the third insulating portion protrudes beyond the second end surface, and the third insulating portion abuts against the second end surface and covers an opening end of the inner cavity.

7. The casing assembly according to claim 6, wherein the second end surface protrudes outward to form a second annular protrusion, and an inner side wall surface of the second annular protrusion abuts against an outer side wall surface of the third insulating portion.

8. The casing assembly according to claim 7, wherein the casing further comprises an insulating layer, the insulating layer is disposed on an inner side surface of the casing, a relief hole is provided on the insulating layer, and the third insulating portion and the second annular protrusion are both disposed in the relief hole.

9. The casing assembly according to claim 1, wherein the connecting member has a connecting end surface, and the connecting end surface is configured to be sealingly connected to a hole wall of the through hole.

10. The casing assembly according to claim 9, wherein in an axial direction of the through hole and in a direction facing toward an interior of the casing, an aperture of the through hole tends to decrease.

11. The casing assembly according to claim 10, wherein in a thickness direction of the connecting member, an outer diameter of the connecting member tends to decrease.

12. The casing assembly according to claim 2, wherein a pressure relief mechanism is disposed on the end cover, and the through hole is located at a peripheral side of the pressure relief mechanism.

13. The casing assembly according to claim 1, wherein the first contact portion is configured to be disposed at the outer side of the casing, the sealing assembly further comprises an insulating sleeve, and the insulating sleeve is configured to be capable of sleeving the first contact portion.

14. A battery cell wherein the battery cell comprises a cell assembly, a heating apparatus, and the casing assembly according to claim 1, wherein the cell assembly is disposed at an inner side of a casing of the casing assembly, the heating apparatus is disposed on the cell assembly, a second contact portion is configured to be disposed at the inner side of the casing, and the heating apparatus is electrically connected to the second contact portion.

15. A battery wherein the battery comprises at least the battery cell according to claim 14.

16. An electric apparatus wherein the electric apparatus comprises at least the battery according to claim 15.

17. The casing assembly according to claim 1, wherein the connecting member is an annular aluminum pressing piece, the insulating member is a cylindrical insulating block inserted into the inner cavity, opposite ends of the insulating block protrude beyond opposite side surfaces of the annular aluminum pressing piece, respectively.

18. The casing assembly according to claim 8, wherein the second annular protrusion is integrally formed on the second end surface of the connecting member and annularly disposed around the third insulating portion, the third insulating portion is accommodated inside the relief hole.

19. The casing assembly according to claim 8, wherein the second annular protrusion separates the third insulating portion and the insulating layer along a radial direction of the relief hole.

20. The casing assembly according to claim 9, wherein a threaded structure is formed on the connecting end surface, an internal thread is correspondingly formed on the hole wall of the through hole, and the connecting member is screwed into the through hole, such that the connecting end surface is threadedly connected to the hole wall of the through hole to form a seal.

* * * * *